US011076347B2

(12) United States Patent
So (10) Patent No.: US 11,076,347 B2
(45) Date of Patent: Jul. 27, 2021

(54) COEXISTENT SLICING GROUP SUPPORT IN NETWORK SLICING (71) Applicant: ZTE Corporation, Guangdong (CN)

(72) Inventor: Tricci So, Oceanside, CA (US)

(73) Assignee: ZTE Corporation, Shenzhen (CN)

( * ) Notice: Subject to any disclaimer, the term of this patent is extended or adjusted under 35 U.S.C. 154(b) by 53 days.

(21) Appl. No.: 16/149,113

(22) Filed: Oct. 1, 2018

(65) Prior Publication Data
US 2020/0107250 A1 Apr. 2, 2020

(51) Int. Cl.
H04W 48/16 (2009.01)
H04W 60/00 (2009.01)
H04W 76/10 (2018.01)

(52) U.S. Cl.
CPC ........... *H04W 48/16* (2013.01); *H04W 60/00* (2013.01); *H04W 76/10* (2018.02)

(58) Field of Classification Search
CPC ...... H04W 48/16; H04W 60/00; H04W 76/10
See application file for complete search history.

(56) References Cited

U.S. PATENT DOCUMENTS

| 2019/0029065 A1* | 1/2019 | Park | H04W 8/02 |
| 2019/0158408 A1* | 5/2019 | Li | H04L 67/104 |
| 2019/0174449 A1* | 6/2019 | Shan | H04W 60/00 |
| 2019/0357131 A1* | 11/2019 | Sivavakeesar | H04W 76/19 |
| 2019/0394279 A1* | 12/2019 | Dao | H04W 48/04 |
| 2020/0053562 A1* | 2/2020 | Kim | H04W 76/10 |
| 2020/0092706 A1* | 3/2020 | Kawasaki | H04W 60/04 |
| 2020/0137552 A1* | 4/2020 | Park | H04W 76/18 |
| 2020/0137675 A1* | 4/2020 | Park | H04W 80/10 |
| 2020/0252862 A1* | 8/2020 | Kim | H04W 8/08 |

OTHER PUBLICATIONS

3GPP TS 23.501: "System Architecture for the 5G System", Mar. 2019.
3GPP TS 23.502: "Procedures for the 5G System", Mar. 2019.
3GPP TS 23.203: "Policies and Charging control architecture", Mar. 2019.

* cited by examiner

Primary Examiner — Saad A. Waqas
(74) Attorney, Agent, or Firm — Perkins Coie LLP (57) ABSTRACT A wireless terminal transmits a registration request to a first network device indicating that the wireless terminal supports a use of a coexistent slice grouping technique. Here, the coexistent slice grouping technique groups network slices in groups in which intra-group network slices are capable of serving the wireless terminal simultaneously and inter-group network slices are disallowed from serving the wireless terminal simultaneously. The wireless terminal receives a message carrying information about one or more of an allowed network slice instance assistance information (NS-SAI) and a configured NSSAI and performs further communication by the wireless terminal based on the information in the message.

30 Claims, 8 Drawing Sheets

COEXISTENT SLICING GROUP SUPPORT IN NETWORK SLICING

TECHNICAL FIELD

The present document relates to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

The present document describes techniques that can be used to provide network slicing services to user terminals.

In one example aspect, a method of wireless communication is disclosed. The method includes transmitting, by a wireless terminal, a registration request to a first network device indicating that the wireless terminal supports a use of a coexistent slice grouping technique. The coexistent slice grouping technique groups network slices in groups in which intra-group network slices are capable of serving the wireless terminal simultaneously and inter-group network slices are disallowed from serving the wireless terminal simultaneously. The method further includes receiving, by the wireless terminal, a message carrying information about one or more of an allowed network slice instance assistance information (NSSAI) and a configured NSSAI. The method further includes performing further communication by the wireless terminal based on the information in the message.

In another example aspect, a method of wireless communication is disclosed. The method includes receiving, by a network-side device, a registration request from a wireless terminal indicating that the wireless terminal supports a use of the coexistent slice grouping technique. The method includes transmitting, by the network device, a message carrying information about one or more of an allowed network slice instance assistance information (NSSAI) and a configured NSSAI. The method includes providing further connectivity to the wireless terminal based on the information in the message.

In yet another aspect, one or more of the above-described methods may be implemented by a wireless communications apparatus that includes a processor.

In yet another aspect, the above-described methods may be embodied as processor-executable code and stored on a computer readable medium.

These, and other, features are described in the present document.

DETAILED DESCRIPTION

Section headers are used in the Detailed Description section to facilitate ease of understanding and do not limit the use of the disclosed technologies and embodiments in any section only to that section. Furthermore, while certain concepts and embodiments have been explained using 5G nomenclature, the techniques and embodiments are not limited to 5G systems and devices only and may be used in other communication networks that use different protocols.

This patent document relates to a method to define a core network solution based on the Third Generation Partnership Project (3GPP) Release 15 5G system which is designed to support user equipment (UE) to access network slices that are not allowed to serve the UE simultaneously, i.e. set of network slices that cannot co-exist to serve the UE. This patent document discloses techniques that may be used by embodiments to organize the set of network slices that can serve the UE simultaneously into a slicing group. Conversely, network slices that are not in the same group are not permitted to serve the UE simultaneously within the 5G system. Some embodiments disclosed herein are related to a network slicing solution in a 3GPP 5G system to support UE to access network slices which cannot be coexisted with each other to serve the UE simultaneously.

In 3GPP Release 15, the fundamental design of Network Slicing support in 5G system has been defined. However, the Release 15 network slicing solution assumes that all the UE's subscribed S-NSSAIs (Single Network Slice Selection Assistance Information, as specified in 3GPP technical specification TS 23.501, represents the network slice corresponding to the support for one or more network services in the 3GPP 5G system) that are allowed by the UE's serving public land mobile network (PLMN) can be used to serve the UE simultaneously.

There are scenarios due to deployment, regulation or per Service Level Agreement (SLA) between operators, some UEs may be restricted from using a set of services (S-NSSAIs) simultaneously. Some examples are as follows.

(a) by operator's or corporation's operational policies, national or regional regulations etc., which might be forbidden for a UE to access "regular" services and "specific" services, e.g. a UE used by a government officer might be restricted to be either in "off-duty" (regular) or "on-duty" (specific) mode. It is forbidden by regulation for the UE to access simultaneously the off-duty services and the on-duty services.

(b) by network capability: for example, a factory device may have two modes of operations: "maintenance mode" (used to perform updates, e.g. blueprints upload, check the status of the devices, monitoring and maintenance, etc.) and a "ultra-low latency factory mode", where the device receives ultra-reliable low latency communication (URLLC) commands to perform its duty. In that case, the AMF instance used for the URLLC factory slice may be tailored specifically to that duty, and not be able to support other services such as file database access, etc. In that case, the device may have to select either mode and not connect to both simultaneously.

In the context of some embodiments disclosed in this patent document, the scenarios that are described above are referred as "Non-coexistent Access to Network Slices", i.e. the set of network slices cannot be accessible by a UE concurrently when their respective S-NSSAIs are present in the UE's subscription, however, the UE is prevented from accessing certain set of S-NSSAIs simultaneously.

Figure 1:
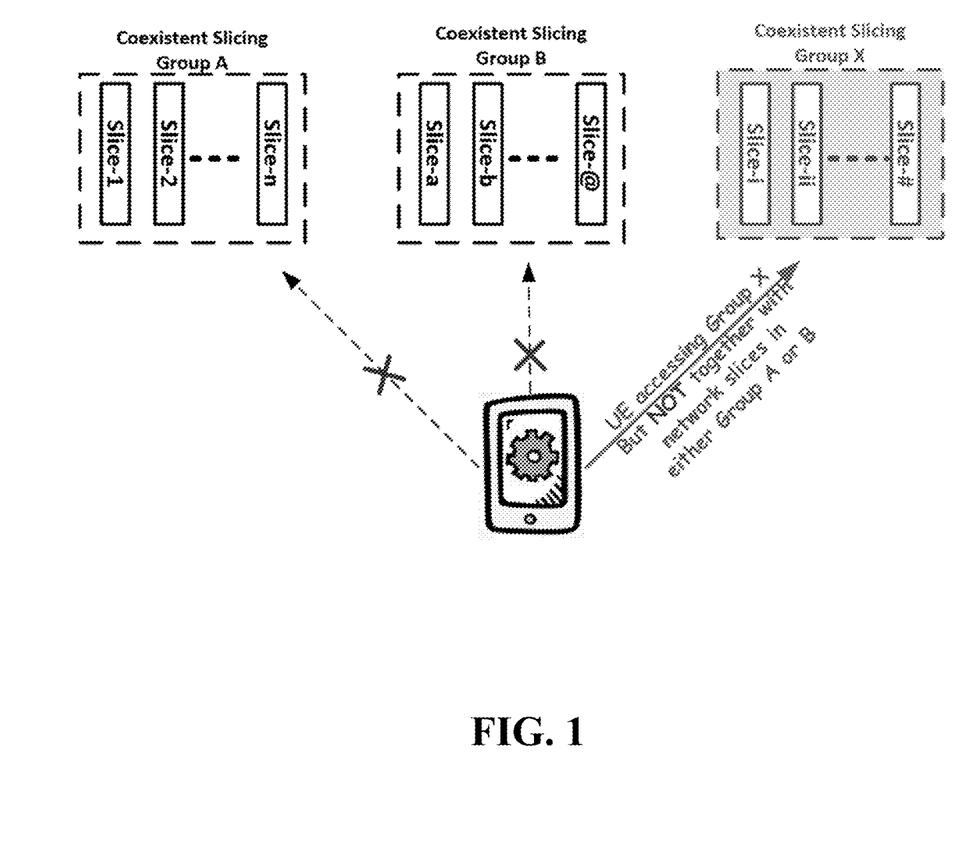
FIG. 1 illustrates an example of coexistent slice grouping.

One intent of the disclosed techniques is to support non-coexistent access of network slices in 5G system (5GS) as shown in FIG. 1. Within a group of network slices, each network slice can serve the UE simultaneously with other network slice(s) within the 5G system. However, network slices that are not in the same group cannot serve the UE simultaneously within the 5GS.

In some embodiment disclosed in the present document, network slices within the Coexistent Slicing Group can serve the UE simultaneously. Network slices between the coexistent slicing groups cannot serve the UE simultaneously.

Examples of Design Rules Used by Some Embodiments

The design principles used in some embodiments support the UE to access network slices that cannot serve the UE simultaneously are as follows:

Minimum impact to the existing Release 15 network slicing signalling procedures between the UE and the network:

Minimum impact to the existing Release 15 UE's registration and PDU Session Management procedures.

Minimum impact to the existing Release 15 slice selection procedure.

No impact to Release 15 UE.

No impact to other existing Release 15 basic system procedures such as the Mobility Management procedure, UE Configuration Update procedures, etc.

No impact to the existing Release 15 roaming procedure.

No impact to the existing Release 15 UE Route Selection Policy (URSP)/Network Slice Selection Policy (NSSP) (refer to clause 6.6.2 in 3GPP TS 23.503 [2] for more details) used for network slicing to service mapping.

In this document, the reference to the Single Network Slice Selection Assistance Information (S-NSSAI), as specified in 3GPP technical specification TS 23.501, represents the network slice corresponding to the support for one or more network services in the 3GPP 5G system. The reference of Network Slice Selection Assistance Information (NSSAI) is a collection of S-NSSAIs.

Basic Assumptions and Concepts of Coexistent Slicing Group

1) In this patent document, for a simplified discussion of some embodiments, it assumes that different Coexistent Slicing Groups do NOT share the same serving Access and Mobility Management Function (AMF) (refer to 3GPP TS 23.501 for more details on the functionality of AMF) which is the anchor point to support the Non Access Stratum (NAS) communication between UE and the 5G Core. However, it is possible to perform inter AMF coordination to implement the disclosed techniques.

2) Carrying on the same operational practice in 3GPP Release 15 for the roaming support, for ease of description, this document expects that UE and the serving PLMN are required to support Coexistent Slicing Group in order to enable this feature in the 3GPP 5G system. In case of roaming, the Visited PLMN (i.e. VPLMN) is the serving PLMN, and therefore, there will be also Home PLMN (HPLMN), and both of these PLMNs as well as UE are required to be capable of supporting Coexistent Slicing Group in order to enable this feature.

3) For the UE which is capable of supporting Coexistent Slicing Group, UE will be configured with UE capability to indicate whether it supports this feature.

4) For the 5G core network which is not capable of supporting Coexistent Slicing Group, even when the UE presents its support for this feature during the UE Registration, such capability will be ignored by the 5G core network in the 5G system, and only the network slices that can serve the UE simultaneously are assigned to the UE.

5) Two scenarios when provisioning/configuring S-NSSAI(s) to the UE during the UE registration with the PLMN are:

Scenario A) S-NSSAIs for the UEs for the Network Slices that all serve the UE simultaneously.

Scenario B) S-NSSAIs for UEs for the Network Slices that do NOT all serve the UE simultaneously.

Same as in today's 3GPP Release 15, during the UE Registration with the serving PLMN, the Unified Data Management (UDM—refer to 3GPP TS 23.501 for more details) may provide the serving PLMN the UE's subscriptions which include the Subscribed S-NSSAI(s) configured by the home PLMN of the UE. In case of roaming, according to the local policy and/or service level agreement (SLA), the serving VPLMN will then map the Subscribed S-NSSAI(s) configured by the HPLMN to the applicable S-NSSAI(s) configured by the serving VPLMN.

For scenario A above, there is only one set of provisioned/configured S-NSSAI that all serve the UE simultaneously.

For scenario B above, the set of provisioned/configured S-NSSAI configured by the HPLMN will be composed of two or more set of S-NSSAIs that do NOT serve the UE simultaneously. In case of roaming, the corresponding mapping S-NSSAI(s) configured by the VPLMN will also be composed of two or more set of S-NSSAIs that do not serve the UE simultaneously.

Example Features of Coexistent Slicing Group

This patent document discloses the concept of "Coexistent Slicing Group" to support the UE to access the network slices that cannot serve the UE simultaneously. By design, the S-NSSAIs "within" the same Coexistent Slicing Group can serve the UE simultaneously, however, the S-NSSAI(s) from different slicing groups cannot serve the UE simultaneously.

Note that, there are many 3GPP terms used in the patent document to describe 5G embodiments, and accordingly, the 3GPP technical specification TS 23.501 is incorporated by reference herein.

Figure 2:
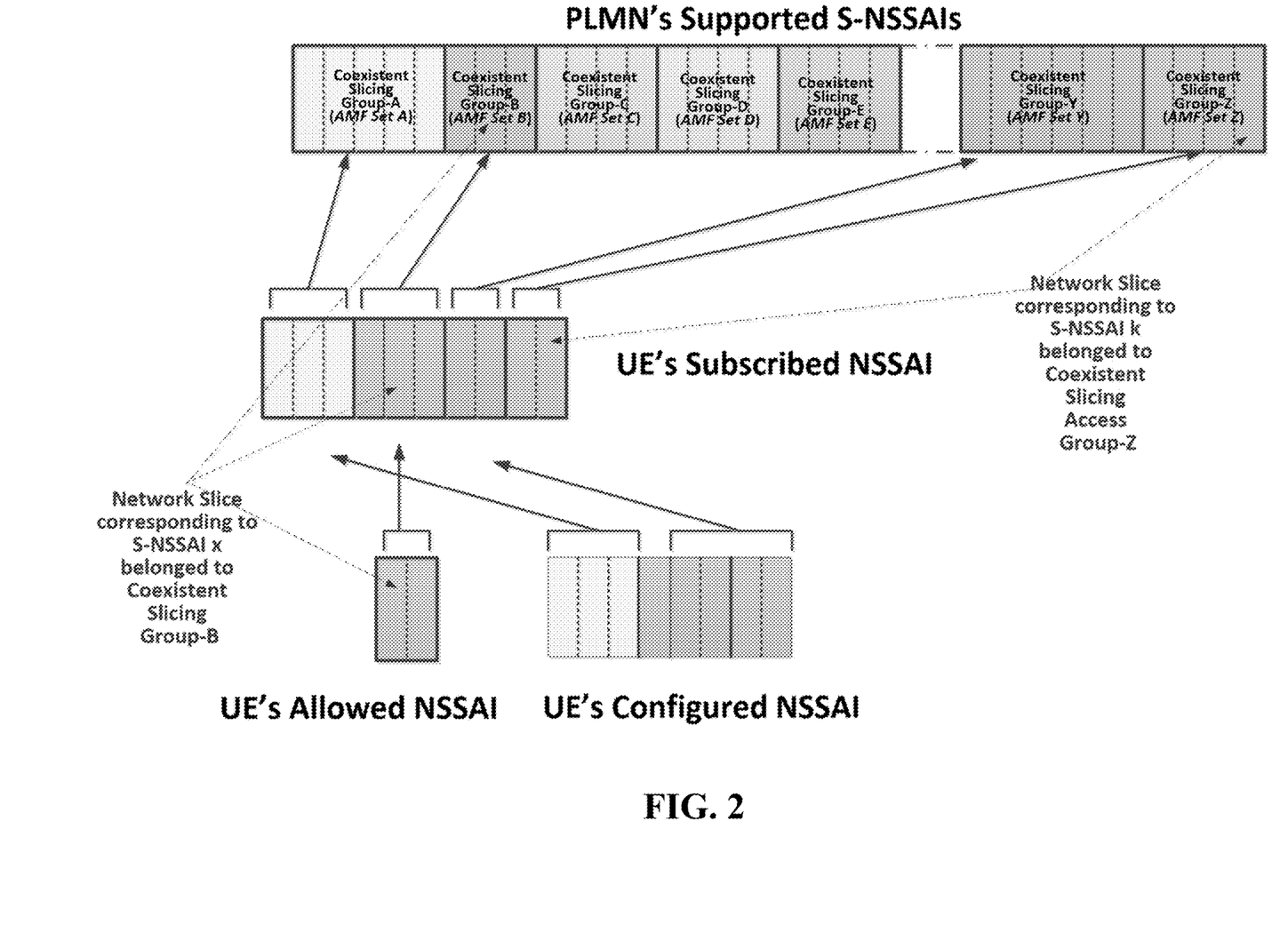
FIG. 2 shows an example of coexistent slice groups and their corresponding NSSAIs.

FIG. 2 shows an example of how the serving PLMN could organize the Coexistent Slicing Groups, and how the Allowed NSSAI (see 3GPP TS 23.501 for proper definition) and the corresponding serving AMF may be derived from the Coexistent Slicing Group.

During the UE registration with the 5G Core that supports Coexistent Slicing Group, the following main scenarios should be considered:

1) If the UE does not provide the Requested NSSAI (see 3GPP TS 23.501 for proper definition) and the UE's capability indicates that the UE is capable of supporting Coexistent Slicing Group, if there is more than one Coexistent Slicing Groups configured for the UE according to UE's subscription as described in scenario B. above, based on the local and/or the roaming policy, the serving PLMN (via serving AMF or Network Slice Selection Function (NSSF)) will select a particular slicing group and derive the Allowed NSSAI (see 3GPP TS 23.501 for proper definition) for the UE from the selected slicing group, and if applicable, any associated S-NSSAI mappings with the Home PLMN are also determined. The unselected Coexistent Slicing Groups and the associated mappings with the Home PLMN, if applicable, will also be provided to the UE as the Configured NSSAI as in Release 15 as shown in FIG. 2. The associated slicing group information is also included for each S-NSSAI Identifier (see FIG. 3) in the Configured NSSAI (see 3GPP TS 23.501 for proper definition) as well as in the associated mapping, if applicable.

2) If the UE provides the Requested NSSAI during the UE registration and the UE's capability indicates that, the UE is capable of supporting Coexistent Slicing Group, the serving PLMN decides the Allowed NSSAI based on the Requested NSSAI as in Release 15. In addition, if there is more than one Coexistent Slicing Groups configured for the UE according to the UE's subscription as described in scenario B. above, the unselected Coexistent Slicing Groups and the associated mappings with the HPLMN, if applicable, will also be provided to the UE as the Configured NSSAI as in Release15. The associated slicing group information is also included for each S-NSSAI in the Configured NSSAI as well as in the associated mapping, if applicable.

3) If the there is no indication that the given UE is capable of supporting Coexistent Slicing Group, the serving network will only provide the UE for the Allowed NSSAI and/or Configured NSSAI with the S-NSSAIs as described in scenario A above and, if applicable, the associated mappings with the HPLMN that call all be served by the same AMF simultaneously.

4) The support for Coexistent Slicing Group feature should be end-to-end, i.e. between UE and UE's serving PLMN, and in case of roaming, the UE's serving PLMN is the VPLMN, and hence, the UE, VPLMN and HPLMN are all required to support Coexistent Slicing Group in order to enable this feature.

Table 1 summarizes the end-to-end considerations for supporting the Coexistent Slicing Group in 5G Core.

TABLE 1

Summary of Considerations End-to-end Coexistent Slicing Group Support for Network Slicing

| UE Coexistent Slicing Group capability | Serving PLMN Coexistent Slicing Group capability | Home PLMN Coexistent Slicing Group capability | End-to-end Coexistent Slicing Group Support |
|---|---|---|---|
| Release15 UE | N/A | N/A | N/A | No |
| New Release UE | No | N/A | N/A | No |
| | Yes | No | No | No |
| | Yes | No | Yes | No |
| | Yes | Yes | No | No |
| | Yes | Yes | Yes | Yes |

The serving AMF is part of the network slice, same AMF/AMF Set (refer to 3GPP TS 23.501 for definition) cannot serve two different Coexistent Slicing Groups. Different Allowed NSSAIs from different Coexistent Slicing Groups are served by different AMF/AMF Set. Hence, once the UE is registered, the serving AMF is corresponding to the Allowed NSSAI for particular Coexistent Slicing Group. If the UE, that supports Coexistent Slicing Group, wants to activate service not belonging to the same Coexistent Slicing Group, then the UE will re-register with the new Requested NSSAI that includes the S-NSSAIs from the Configured NSSAI corresponding to the target service, and any existing PDU session, if any, will be released according to clause 5.15.5.2.2 in 3GPP TS 23.501 [1] before the UE is registered with the new set of S-NSSAI(s) in the new Coexistent Slicing Group.

Once Allowed NSSAI is identified, the subsequent PDU Session Establishment procedure is the similar to today Release 15 procedures as described in clause 5.15.5 in 3GPP TS 23.501 [1], except for the following:

The UE should only include the S-NSSAI from the Allowed NSSAI in the Requested NSSAI for UE registration; and if using the S-NSSAI from the Configured NSSAI, it should have the same Slicing Group ID as the S-NSSAI in the Allowed NSSAI.

The serving AMF should verify the Slicing Group ID of the S-NSSAI in the Requested NSSAI is the same as the Allowed NSSAI that has been provided to the UE. Otherwise, the PDU Session Establishment request should be rejected with the proper cause to indicate the inappropriate Slicing Group ID of the S-NSSAI in the Requested NSSAI.

Examples of Identification of Coexistent Slicing Group

Figure 3:
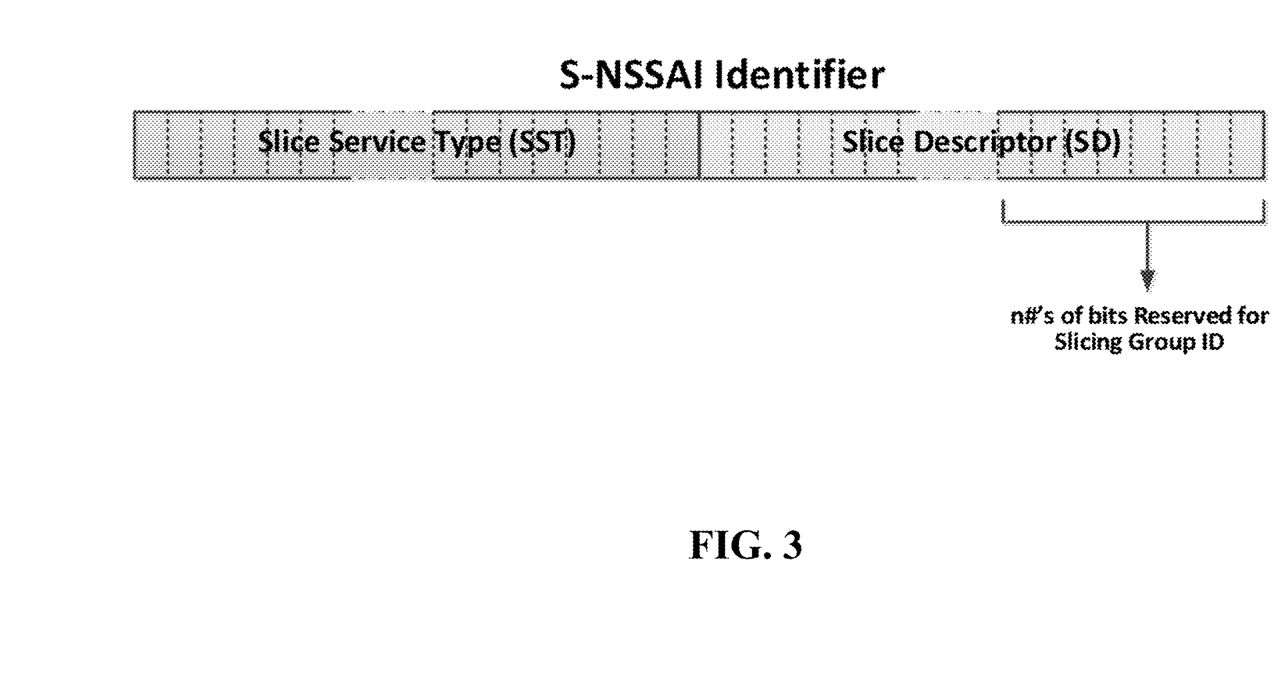
FIG. 3 shows an example of extending a slice descriptor field to identify a coexistent slice group.

In order to support UE to differentiate different slicing groups for mutually exclusive access and to support 5G Core routing support for directing the registration request of the requested Coexistent Slicing Group to the proper target AMF, two techniques, either alone or together, may be used to identify a Coexistent Slicing Group:

(1) Reserving a portion of the SD field from S-NSSAI (see clause 5.15.2.1 in 3GPP TS 23.501 for more details) as the Slicing Group Identifier. For example, as shown in FIG. 3, the SD field could be extended to indicate the support for Coexistent Slicing Group.

Pros of this approach are:

The Group identifier is imbedded into the S-NSSAI and no need for introducing a new identifier.

Minimal impact to the existing interface and the slicing related procedures by the UE and by the Network given the Group Identifier is imbedded into the S-NSSAI and hence, no new parameter is needed.

Possible cons are:

The size of the SD field is reduced and hence, the number of slice descriptors that could be included may be reduced.

(2) Introducing an additional Slicing Group Identifier which is used to associate with the S-NSSAI. Pros and cons of this approach are:

Pros:

No need to modify the S-NSSAI and hence, the size of the SD field is not impacted.

Possible Cons:

Embodiments will introduce an additional identifier for the slicing group id.

May impact to the existing interface and the slicing procedures given new parameter is needed to indicate the Group Identifier to be associated with the S-NSSAI for coordination.

In 5G networks, the Coexistent Slicing Group ID is per PLMN. In case of roaming, Slicing Group ID in the serving PLMN may have different value from the home PLMN. This is not different in Release 15, where serving PLMN and home PLMN will have their own respective S-NSSAIs for the given network slice. Similar to Release 15, there will be SLA agreement on the mapping for the S-NSSAIs between the serving PLMN and home PLMN to support Coexistent Slicing Group.

In some implementations, a scenario may exist that operator may configure one or more S-NSSAI(s) that can serve the UE simultaneously together with any Coexistent Slicing Group. In this case, such S-NSSAI(s) are not tied to any specific slicing group and there should be a special Slicing Group ID defined for such kind of S-NSSAI.

If option (1) approach is taken by an embodiment, only the SD field is affected, hence, there is no impact to the Standardized SST value. Therefore, operator can organize the given S-NSSAIs with Standardized SST values by leveraging the SD field to support the grouping for Coexistent Slicing Group.

If option (2) is taken by embodiments, then, it will have more impact to the existing 3GPP Release 15 5G Core interfaces that support network slicing related procedures.

FIG. 3 shows an example of extending SD to identify the Coexistent Slicing Group.

The original definition of the S-NSSAI Identifier is defined in clause 5.15.2.1 in 3GPP specification TS 23.501. Some embodiments disclosed herein will change the SD field, as shown in FIG. 3, to be extended to include the Slicing Group Identifier as a preferred of the two solution options.

Examples of UE Support for Coexistent Slicing Group

For the UE that is not capable of supporting Coexistent Slicing Group attaches to the 5G Core that is capable to support Coexistent Slicing Group, such UE will be provided with S-NSSAI(s) that can serve the UE simultaneously (see option A. in the descriptions of the working assumptions above). This invention imposes no impact to existing Release 15 UE.

For the UE that is capable of supporting Coexistent Slicing Group, and if the 5G Core supports also the Coexistent Slicing Group, the UE includes the S-NSSAIs that are from the same Coexistent Slicing Group in the Requested NSSAI during the UE's registration and also during the UE Session Establishment procedures.

In 5G implementations consistent with the present document, embodiments do not require any changes to clause 5.15.4, 3GPP TS 23.501 [1] for the NSSAI storage aspects in the UE.

Roaming Support for Coexistent Slicing Group

In case of roaming, in order to enable Coexistent Slicing Group feature, UE and the serving PLMN are all capable of supporting Coexistent Slicing Group. In case of roaming, the serving PLMN is the VPLMN and both the VPLMN and HPLMN as well as the UE are should be capable of supporting Coexistent Slicing Group. Based on such working assumption, the VPLMN and HPLMN would have to coordinate the mapping of their respective configured S-NSSAI(s) with their corresponding Coexistent Slicing Group IDs according to the SLAs between the PLMNs and their respective local policies.

URSP/NSSP Support for Coexistent Slicing Group

The URSP/NSSP (UE route selection policy, network slice selection policy) in Release 15 provides the service mapping between the Allowed/Configured S-NSSAIs in the UE to the UE's service applications (refer to clause 6.6.2 in 3GPP TS 23.503 for more details). The same service mapping functionality could be used in the embodiments disclosed herein.

As described in the working assumptions above, there are two scenarios of S-NSSAIs (Scenarios A. and B.) provisioned/configured by 5G Core to the UEs dependent on end-to-end support for the Coexistent Slicing Group across UE and the serving PLMN.

In the case that the UE, which is capable of supporting Coexistent Slicing Group, and is moving from Coexistent Slicing Group capable 5G Core to incapable 5G Core or vice versa, during the UE re-registration, the prior Allowed and Configured NSSAIs that were stored in the UE may be completely replaced by a new set of provisioned S-NSSAIs (refer to the procedures as described in clause 5.15.4 in 3GPP TS 23.501 [1]). As a result, the UE will refer to the new set of S-NSSAI(s) (i.e. either scenario A. or scenario B. above) and the revised URSP/NSSP policies updated by the serving Policy Control Function (PCF) (refer to 3GPP TS 23.503 [2] for more details) for the service mapping to support the subsequent PDU Session Establishment procedures.

In summary, the existing URSP/NSSP related procedures as described in 3GPP TS 23.501 [1], TS 23.502[3] and TS 23.503 [2] are unchanged, and this patent documents makes no impact to the existing design of the URSP/NSSP as defined in 3GPP Release 15.

Examples of AMF Support for Coexistent Slicing Group

The following procedures are described based on clause 5.15.5.2.1, in 3GPP TS 23.501 [1] with the changes shown in italic fonts and the changes are based on the use of option (1) (i.e. leveraging part of the SD field within the S-NSSAI as the Slicing Group ID) for the Slicing Group Identification as described above to identify the Coexistent Slicing Group.

(A) During the UE's registration, once the UE's subscriptions for the network slicing are obtained from UDM, depending on AMF local configuration, the AMF may be allowed to determine whether it can serve the UE, and the following is performed:

AMF checks whether it can serve all the S-NSSAI(s) from the Requested NSSAI present in the Subscribed S-NSSAIs (potentially using configuration for mapping S-NSSAI values between HPLMN and Serving PLMN), or all the S-NSSAI(s) marked as default in the Subscribed S-NSSAIs in the case that no Requested NSSAI was provided or none of the S-NSSAIs in the Requested NSSAI were present in the Subscribed S-NSSAIs (see clause 5.15.3 in TS 23.501 [1]).

If Coexistent Slicing Group is supported and there is more than one slicing groups marked as default in the Subscribed S-NSSAIs, based on the operator's configuration, the AMF will then decide which particular Slicing Group is to be selected.

If the AMF can serve the S-NSSAIs in the Requested NSSAI, the AMF remains the serving AMF for the UE. The Allowed NSSAI is then composed of the list of S-NSSAI(s) in the Requested NSSAI permitted based on the Subscribed S-NSSAIs, or, if no Requested NSSAI was provided, all the S-NSSAI(s) marked as default in the Subscribed S-NSSAIs, and if Coexistent Slicing Group is supported, the Allowed NSSAI is composed of the default Subscribed S-NSSAIs for the selected Slicing Group. The AMF also determines the mapping if the S-NSSAI(s) included in the Allowed NSSAI needs to be mapped to Subscribed S-NSSAI(s) values.

If no Allowed NSSAI is determined from above, the AMF based on the Subscribed S-NSSAI(s) and operator's configuration may also determine the Configured NSSAI for the Serving PLMN or/and the associated mapping of the Configured NSSAI to the Configured NSSAI for the HPLMN, so these can be configured in the UE. Then Step (C) below is executed.

Otherwise, the AMF queries the NSSF (see (B) below).

(B) When required as described above, the AMF needs to query the NSSF, and the following is performed:

The AMF queries the NSSF, with Requested NSSAI, mapping of Requested NSSAI to Configured NSSAI for the HPLMN, the Subscribed S-NSSAIs (with an indication if marked as default S-NSSAI), any Allowed NSSAI it might have for the other Access Type (including its mapping to the Configured NSSAI for the HPLMN), PLMN ID of the SUPI and UE's current Tracking Area(s).

When more than one UE's Tracking Area is indicated, the UE is using more than one Access Type.

Based on this information, local configuration, and other locally available information including RAN capabilities in the current Tracking Area for the UE or load level information for a network slice instance provided by the Network Data Analytics Function (NWDAF), the NSSF does the following:

It verifies which S-NSSAI(s) in the Requested NSSAI are permitted based on comparing the Subscribed S-NSSAIs with the S-NSSAIs in the mapping of Requested NSSAI to Configured NSSAI for the HPLMN. It considers the S-NSSAI(s) marked as default in the Subscribed S-NSSAIs in the case that no S-NSSAI from the Requested NSSAI are present in the Subscribed S-NSSAIs.

It selects the Network Slice instance(s) to serve the UE. When multiple Network Slice instances in the UE's Tracking Areas are able to serve a given S-NSSAI, based on operator's configuration, the NSSF may select one of them to serve the UE, or the NSSF may defer the selection of the Network Slice instance until a NF/service within the Network Slice instance needs to be selected.

It determines the target AMF Set to be used to serve the UE, or, based on configuration, the list of candidate AMF(s), possibly after querying the NRF.

It determines the Allowed NSSAI(s) for the applicable Access Type(s), taking also into account the availability of the Network Slice instances as described in clause 5.15.8 in 3GPP TS 23.501 [1] that are able to serve the S-NSSAI(s) in the Allowed NSSAI in the current UE's Tracking Areas. If there is more than one slicing groups in the Subscribed S-NSSAIs, based on the operator's configuration and local policy, the NSSF will then decide which particular Slicing Group is to be selected as the Allowed NSSAI(s) for the applicable Access Type(s).

It also determines the mapping of each S-NSSAI of the Allowed NSSAI(s) to the Subscribed S-SNSSAIs if necessary.

Based on operator configuration, the NSSF may determine the NRF(s) to be used to select NFs/services within the selected Network Slice instance(s).

Additional processing to determine the Allowed NSSAI(s) in roaming scenarios and the mapping to the Subscribed S-NSSAIs, as described in clause 5.15.6 in 3GPP TS 23.501 [1].

If no Allowed NSSAI is determined from above, the NSSF based on the Subscribed S-NSSAI(s) and operator configuration may derive the Configured NSSAI for the Serving PLMN or/and the associated mapping of the Configured NSSAI to the Configured NSSAI for the HPLMN, so these can be configured in the UE.

The NSSF returns to the current AMF the Allowed NSSAI for the applicable Access Type(s), the mapping of each S-NSSAI of the Allowed NSSAI to the Subscribed S-NSSAIs if determined and the target AMF Set, or, based on configuration, the list of candidate AMF(s). The NSSF may return the NRF(s) to be used to select NFs/services within the selected Network Slice instance(s), and the NRF to be used to determine the list of candidate AMF(s) from the AMF Set. The NSSF may return NSI ID(s) to be associated to the Network Slice instance(s) corresponding to certain S-NSSAIs. NSSF may return the rejected S-NSSAI(s) as described in clause 5.15.4.1 in 3GPP TS 23.501 [1]. The NSSF may return the Configured NSSAI for the Serving PLMN and the associated mapping of the Configured NSSAI to the Configured NSSAI for the HPLMN.

Depending on the available information and based on configuration, the AMF may query the appropriate NRF (e.g. locally pre-configured or provided by the NSSF) with the target AMF Set. The NRF returns a list of candidate AMFs.

If rerouting to a target serving AMF is necessary, the current AMF reroutes the Registration Request to a target serving AMF as described in clause 5.15.5.2.3 in 3GPP TS 23.501 [1].

Step (C) below may be executed.

(C) The serving AMF should determine a Registration Area such that all S-NSSAIs of the Allowed NSSAI for this Registration Area are available in all Tracking Areas of the Registration Area (and also considering other aspects as described in clause 5.3.2.3 in 3GPP TS 23.501 [1]) and then return to the UE this Allowed NSSAI and the mapping of the Allowed NSSAI to the Subscribed S-NSSAIs if provided. The AMF may return the rejected S-NSSAI(s) as described in clause 5.15.4.1 in 3GPP TS 23.501.

As there is a single distinct Registration Area for Non-3GPP access in a PLMN, the S-NSSAIs in the Allowed NSSAI for this Registration Area (i.e. for Non-3GPP access) are available homogeneously in the PLMN.

When no Requested NSSAI was included, or when the mapping of the S-NSSAIs in Requested NSSAI to the corresponding values in the Configured NSSAI for the HPLMN is incorrect, or when an S-NSSAI was rejected in the PLMN, the AMF may update the UE slice configuration information for the PLMN as described in clause 5.15.4.2 in 3GPP TS 23.501.

Example Procedures for UE Registration with 5G System to Support Coexistent Slicing Group The following procedures are based on clause 4.2.2.2.3, in 3GPP TS 23.502[3] with the changes shown in italic fonts and the changes are based on the use of option (1) in clause 6.4.2.2 above for the identification of Coexistent Slicing Group.

When an AMF receives a Registration request, the AMF may need to reroute the Registration request to another AMF, e.g. when the initial AMF is not the appropriate AMF to serve the UE. The Registration with AMF re-allocation procedure, described in FIG. 4.2.2.2.3-1 of 3GPP TS.23.502, is used to reroute the NAS message of the UE to the target AMF during a Registration procedure.

Figure 4:
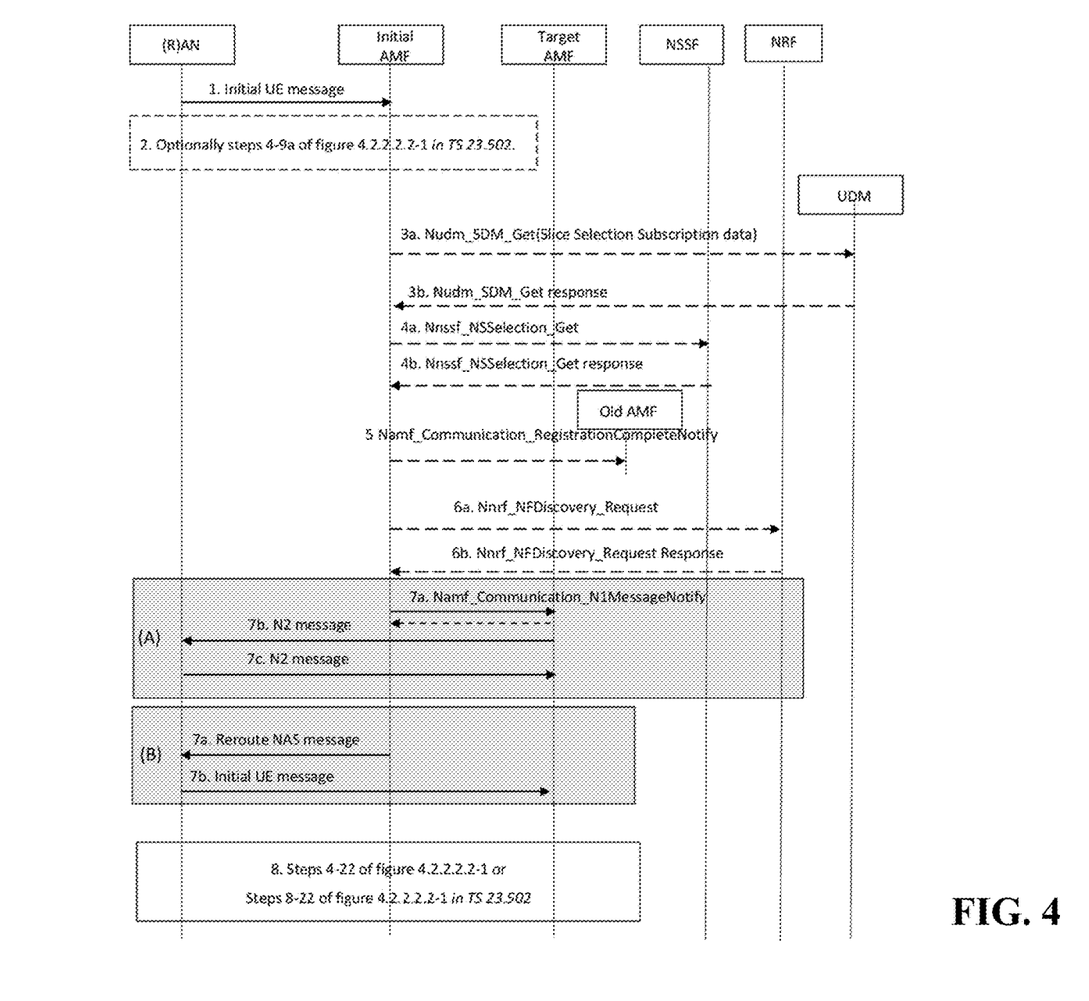
FIG. 4 shows an example user terminal registration procedure to support coexistent slice groups.

FIG. 4 shows an example of a UE registration procedure to support a coexistent slicing group. Various messages exchanged during the registration are described with reference to FIG. 4.2.2.2.2-1 in 3GPP TS 23.502 the document 1. Steps 1 and 2 of FIG. 4.2.2.2.2-1 in 3GPP TS 23.502 [3] have occurred, and the (R)AN sends the Registration request message within an Initial UE message to the initial AMF; and in case the UE is to re-register with Requested NSSAI corresponding to a different Coexistent Slicing Group, the UE should not provide the 5G-GUTI in Access Stratum signaling when performing a Registration procedure. The Initial UE message may include the Requested NSSAI, and the Initial UE message and re-registration message may include the UE MM Core Network Capability that indicates its support for Coexistent Slicing Group.

2. If the AMF needs the SUPI and/or UE's subscription information to decide whether to reroute the Registration Request or if the Registration Request was not sent integrity protected or integrity protection is indicated as failed, then AMF performs steps 4 to 9a of FIG. 4.2.2.2.2-1 in 3GPP TS 23.502 [3].

3a. [Conditional] Initial AMF to UDM: Nudm_SDM_Get (SUPI, Slice Selection Subscription data).

If the initial AMF needs UE's subscription information to decide whether to reroute the Registration Request and UE's slice selection subscription information was not provided by old AMF, then initial AMF request UE's Slice Selection Subscription data from UDM by invoking the Nudm_SDM_Get (see clause 5.2.3.3.1 in 3GPP TS 23.502 [3]) service operation. UDM may get this information from UDR by Nudr_UDM_Query(SUPI, Subscribed S-NSSAIs). In addition, if the serving PLMN, and in case of roaming, the Home PLMN and the UE are capable of supporting the Coexistent Slicing Group, the initial AMF includes also the UE's capability in Nudm_SDM_Get service operation.

3b. UDM to initial AMF: Response to Nudm_SDM_Get. The AMF gets the Slice Selection Subscription data including Subscribed S-NSSAIs. The UDM may provide indication that the subscription data for network slicing is updated for the UE.

UDM responds with slice selection data to initial AMF with the consideration for the support for the Coexistent Slicing Group in the serving PLMN, in the UE (e.g., indicated by the UE MM Core Network Capability provided by the initial AMF), and in case of roaming, in the Home PLMN.

4a. [Conditional] Initial AMF to NSSF: Nnssf_NSSelection_Get (Requested NSSAI, [Mapping Of Requested NSSAI], Subscribed S-NSSAI(s) with the default S-NSSAI indication, TAI, Allowed NSSAI for the other access type (if any), [Mapping of Allowed NSSAI], PLMN ID of the SUPI).

If there is a need for slice selection, (see clause 5.15.2.1 of 3GPP TS 23.501 [1]), e.g. the initial AMF cannot serve all the S-NSSAI(s) from the Requested NSSAI permitted by the subscription information, the initial AMF invokes the Nnssf_NS_Selection_Get service operation from the NSSF by including Requested NSSAI, optionally Mapping Of Requested NSSAI, Subscribed S-NSSAIs with the default S-NSSAI indication, Allowed NSSAI for the other access type (if any), Mapping of Allowed NSSAI, PLMN ID of the SUPI and the TAI of the UE.

4b. [Conditional] NSSF to Initial AMF: Response to Nnssf_NSSelection_Get (AMF Set or list of AMF addresses, Allowed NSSAI for the first access type, [Mapping Of Allowed NSSAI], [Allowed NSSAI for the second access type], [Mapping of Allowed NSSAI], [NSI ID(s)], [NRF(s)], [List of rejected (S-NSSAI(s), cause value(s))], [Configured NSSAI for the Serving PLMN], [Mapping Of Configured NSSAI]).

The NSSF performs the steps specified in point (B) in the procedures described above regarding the AMF Support for Coexistent Slicing Group. The NSSF returns to initial AMF the Allowed NSSAI for the first access type, optionally the Mapping Of Allowed NSSAI, the Allowed NSSAI for the second access type (if any), optionally the Mapping of Allowed NSSAI and the target AMF Set or, based on configuration, the list of candidate AMF(s). The NSSF may return NSI ID(s) associated to the Network Slice instance(s) corresponding to certain S-NSSAI(s). The NSSF may return the NRF(s) to be used to select NFs/services within the selected Network Slice instance(s). It may return also information regarding rejection causes for S-NSSAI(s) not included in the Allowed NSSAI. The NSSF may return Configured NSSAI for the Serving PLMN, and possibly the associated mapping of the Configured NSSAI.

The NRF(s) is returned by the NSSF, if any, belong to any level of NRF (see clause 6.2.6 of 3GPP TS 23.501 [1]) according to the deployment decision of the operator.

5. [Conditional] Initial AMF to old AMF may provide a message that includes Namf_Communication_RegistrationCompleteNotify (failure cause).

The initial AMF decides to reroute the NAS message to another AMF. The initial AMF sends a reject indication to the old AMF telling that the UE Registration procedure did not fully complete at the initial AMF. The old AMF continues as if the Namf_Communication_UEContextTransfer had never been received.

6a. [Conditional] Initial AMF to NRF: Nnrf_NFDiscovery_Request (NF type, AMF Set).

If the initial AMF does not locally store the target AMF address, and if the initial AMF intends to use direct reroute to target AMF or the reroute via (NG-R)AN message needs to include AMF address, then the initial AMF invokes the Nnrf_NFDiscovery_Request service operation from the NRF to find a proper target AMF which has required NF capabilities to serve the UE. The NF type is set to AMF. The AMF Set is included in the Nnrf_NFDiscovery_Request.

6b. [Conditional] NRF to AMF: Response to Nnrf_NFDiscovery_Request (list of (AMF pointer, AMF address, plus additional selection rules and NF capabilities)).

The NRF replies with the list of potential target AMF(s). The NRF may also provide the details of the services offered by the candidate AMF(s) along with the notification endpoint for each type of notification service that the selected AMF had registered with the NRF, if available. As an alternative, it provides a list of potential target AMFs and their capabilities, and optionally, additional selection rules. Based on the information about registered NFs and required capabilities, a target AMF is selected by the initial AMF.

If the initial AMF is not part of the target AMF set, and is not able to get a list of candidate AMF(s) by querying the NRF with the target AMF set (e.g. the NRF locally pre-configured on AMF does not provide the requested information, the query to the appropriate NRF provided by the NSSF is not successful, or the initial AMF has knowledge that the initial AMF is not authorized as serving AMF etc.) then the initial AMF shall forward the NAS message to the target AMF via (R)AN executing step 7(B); the Allowed NSSAI and the AMF Set are included to enable the (R)AN to select the target AMF.

7(A). If the initial AMF, based on local policy and subscription information, decides to forward the NAS message to the target AMF directly, the initial AMF invokes the Namf_Communication_N1MessageNotify to the target AMF, carrying the rerouted NAS message. The Namf_Communication_N1MessageNotify service operation includes the information enabling (R)AN to identify the N2 terminating point and the NAS message carried at step 1, and the UE's SUPI and MM Context if available. If the initial AMF has obtained the information from the NSSF as described at step 4b, that information except the AMF Set or list of AMF addresses is included. The target AMF then updates the (R)AN with a new updated N2 termination point for the UE (step 7b), the (R)AN acknowledges the updated N2 termination point (step 7c). Step 7(B) is skipped.

Steps 7b and 7c can occur separately or as part of the first subsequently required N2 interaction.

7(B). If the initial AMF, based on local policy and subscription information, decides to forward the NAS message to the target AMF via (R)AN, the initial AMF sends a Reroute NAS message to the (R)AN (7a). The Reroute NAS message includes the information about the target AMF and the Registration Request message carried at step 1. If the initial AMF has obtained the information as described at step 4b, that information is included. The (R)AN sends the Initial UE message to the target AMF (7b) indicating reroute due to slicing including the information from step 4b that the NSSF provided.

8. After receiving the Registration Request message transmitted at step 7(A)a or step 7(B)b, if no UE context is received from the initial AMF, the target AMF, based on rerouting due to slicing, continues with the Registration procedure from step 4 until 22 of FIG. 4.2.2.2.2-1 in 3GPP TS 23.501 [1] (with the target AMF corresponding to the new AMF). If the UE context is received from the initial AMF, the target AMF continues with the Registration procedure from step 8 or 9b (depending on whether it decides to reauthenticate the UE) until step 22 of FIG. 4.2.2.2.2-1 in 3GPP TS 23.501 [1], skipping step 10.

Figure 5:
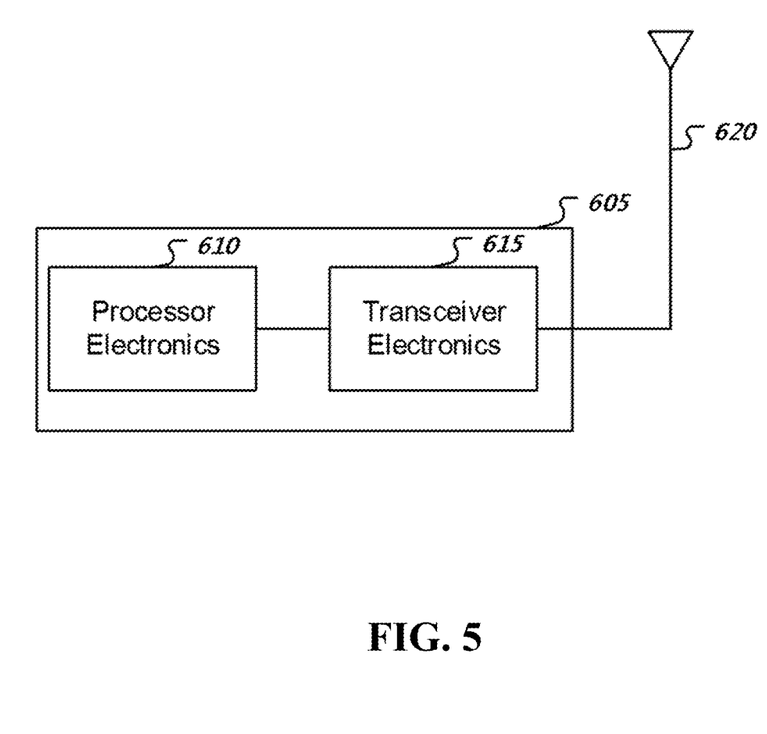
FIG. 5 is a block diagram showing an example embodiment of a wireless communication device.

FIG. 5 is a block diagram representation of a portion of a radio station. A radio station 605 such as the network-side device or a wireless terminal or a UE can include processor electronics 610 such as a microprocessor that implements one or more of the wireless techniques presented in this document. The radio station 605 can include transceiver electronics 615 to send and/or receive wireless signals over one or more communication interfaces such as antenna 620. The radio station 605 can include other communication interfaces for transmitting and receiving data. Radio station 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the radio station 605.

Figure 6:
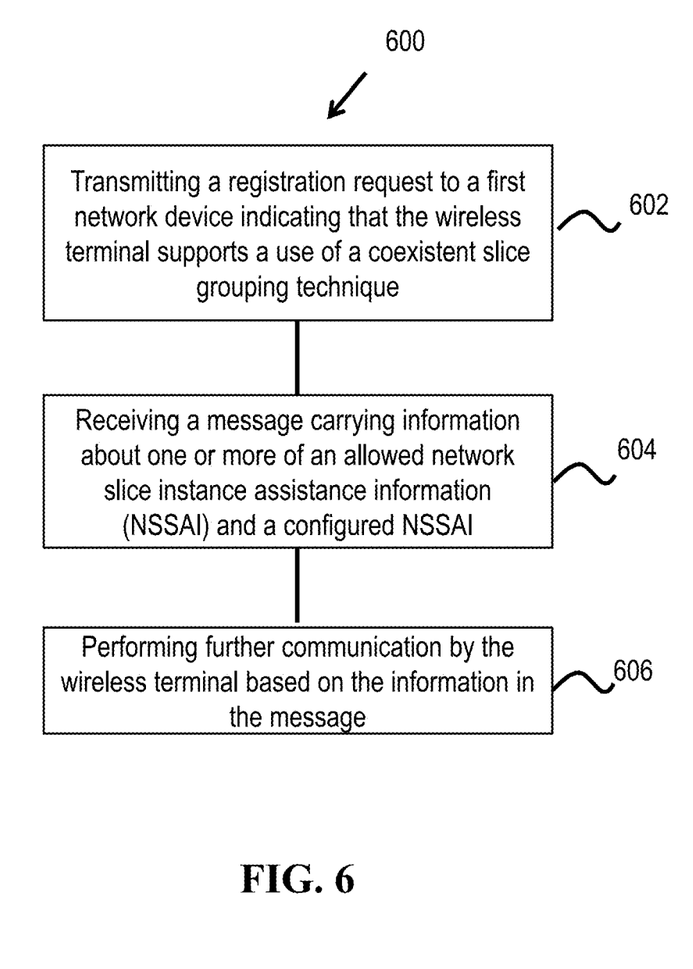
FIG. 6 shows a flowchart for a wireless communication method.

FIG. 6 is a flowchart for an example method 600 of wireless communication. The method 600 includes transmitting (602), by a wireless terminal, a registration request to a first network device indicating that the wireless terminal supports a use of a coexistent slice grouping technique; receiving (604), by the wireless terminal, a message carrying information about one or more of an allowed network slice instance assistance information (NSSAI) and a configured NSSAI and performing (606) further communication by the wireless terminal based on the information in the message. For example, in 5G embodiments, the allowed NSSAI and configured NSSAI may be the Allowed NSSAI and the Configured NSSAI.

In some embodiments of the method 600, the wireless terminal may identify one or more coexistent slice groups for one S-NSSAI based on a slice descriptor field that constitute a portion of an identifier of the S-NSSAI. For example, in 5G implementations, the Slice Descriptor field (SD) as shown in FIG. 3 may be used.

In some implementations of the method 600, the wireless terminal may identify the one or more coexistent slice groups using a signaling mechanism that is external to S-NSSAI. For example, a pre-defined identifier may be used as an additional identifier of S-NSSAI. Other signaling mechanisms such as new messages may also be used.

In some embodiments of the method 600, the wireless terminal may perform further communication by requesting establishment of a PDU session so that the wireless terminal is then able to communicate with other entities in the network, such as application servers, other wireless terminals, and so on.

In some embodiments of the method 600, as described with reference to FIG. 4, the wireless terminal may use different identifying values for the coexistent slice groups, depending on whether the wireless terminal is in home PLMN or visited PLMN and further depending on identity and policies of the PLMN.

In some embodiments of the method 600, the wireless terminal may identify a concurrent S-NSSAI that may simultaneously co-exist and be able to serve one or more coexistent slice groups. For example, the concurrent S-NSSAI may be a "wild card" S-NSSAI that may be universally available or may selectively coexist with some coexistent slice groups.

In some embodiments, the above-described method and techniques may be implemented by a wireless terminal that comprises a processor that is programmed to perform these methods and techniques. The wireless terminal may further include a transceiver for sending registration request and receiving messages from the network-side node.

Figure 7:
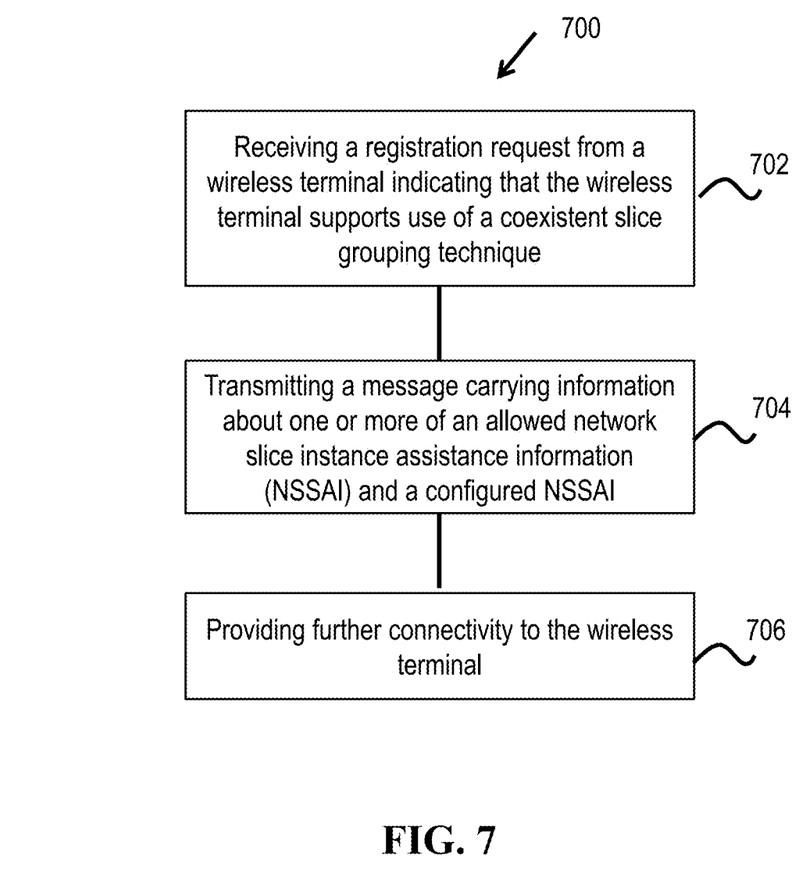
FIG. 7 shows a flowchart for another wireless communication method.

FIG. 7 is a flowchart for an example method 700 of wireless communication. The method 700 includes receiving (702), by a network-side device, a registration request from a wireless terminal indicating that the wireless terminal supports a use of a coexistent slice grouping technique, transmitting (704), by the network device, a message carrying information about one or more of an allowed network slice instance assistance information (NSSAI) and a configured NSSAI to the wireless terminal and providing (706) further connectivity to the wireless terminal based on the information in the message. For example, in 5G embodiments, the allowed NSSAI and configured NSSAI may be the Allowed NSSAI and the Configured NSSAI.

With respect to methods and apparatuses described in the present document, the coexistent slice grouping technique groups network slices in groups in which intra-group network slices are capable of serving the wireless terminal simultaneously and inter-group network slices are disallowed from serving the wireless terminal simultaneously.

In some embodiments of the method 700, the registration request may identify one or more coexistent slice groups for an S-NSSAI based on a slice descriptor field, such as the SD field depicted in FIG. 3, of an identifier of the S-NSSAI.

In some embodiments of the method 700, the signaling mechanism includes an additional identifier for the S-NSSAI that signals the one or more coexistent slice groupings. In some embodiments of the method 800, the network-side node may provide further connectivity to the wireless terminal by establishing a PDU session that is requested by the wireless terminal by ensuring that the PDU session does not conflict with the allowed NSSAIs for the wireless terminal.

In some embodiments of the method 700, the network-side device may receive indication of default coexistent slice groups for the wireless terminal. The network-side device may select one or more of the default coexistent slice groups for the wireless terminal. In some embodiments of the method 700, the registration request may identify concurrent S-NSSAI(s) that are able to co-exist with one or more other S-NSSAIs or coexistent slice groups. In some embodiments of the method 700, the network-side device may identify a unique identifier to the wireless terminal during first, or new, registration and then subsequently use the same unique identifier and refrain from allowing another unique identifier to the wireless terminal during a re-registration procedure.

In some embodiments of the method 700, the network-side device may provide information that the wireless terminal supports the coexistent slice grouping technique to other network functions such as described with respect to FIG. 4.

In some embodiments, the network-side device may be implemented to have a processor configured to implement the above-described methods and techniques. The network-side device may further include transmission or reception circuitry for communicating with the wireless terminal and other devices and functions in the wireless system.

Figure 8:
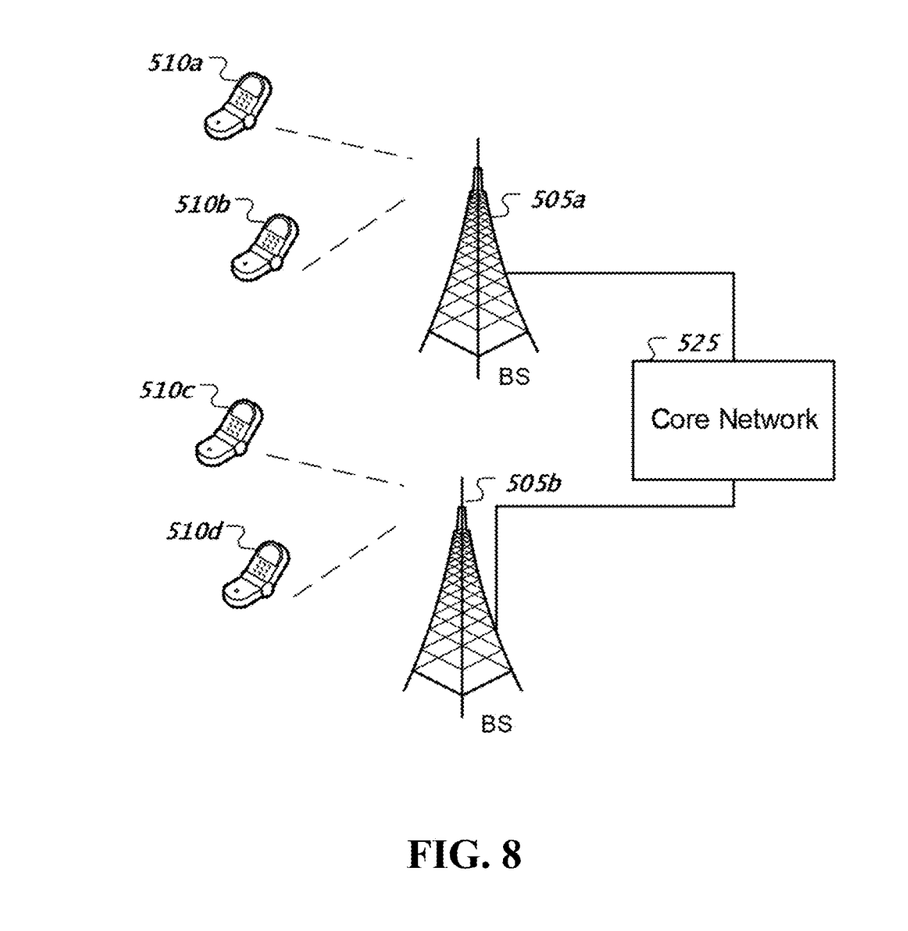
FIG. 8 is a block diagram showing an example of a wireless communication system.

FIG. 8 shows an example of a wireless communication system 500 where techniques in accordance with one or more embodiments of the present technology can be applied. A wireless communication system 500 can include one or more base stations (BSs) 505a, 505b, one or more wireless devices 510a, 510b, 510c, 510d, and a core network 525. A base station 505a, 505b can provide wireless service to wireless devices 510a, 510b, 510c and 510d in one or more wireless sectors. In some implementations, a base station 505a, 505b includes directional antennas to produce two or more directional beams to provide wireless coverage in different sectors.

The core network 525 can communicate with one or more base stations 505a, 505b. The core network 525 provides connectivity with other wireless communication systems and wired communication systems. The core network may include one or more service subscription databases to store information related to the subscribed wireless devices 510a, 510b, 510c, and 510d. A first base station 505a can provide wireless service based on a first radio access technology, whereas a second base station 505b can provide wireless service based on a second radio access technology. The base stations 505a and 505b may be co-located or may be separately installed in the field according to the deployment scenario. The wireless devices 510a, 510b, 510c, and 510d can support multiple different radio access technologies.

In some implementations, a wireless communication system can include multiple networks using different wireless technologies. A dual-mode or multi-mode wireless device includes two or more wireless technologies that could be used to connect to different wireless networks.

It will be appreciated that the present document discloses the use of coexistent grouping of network slices to streamline registration and mobility of user devices in wireless networks and allowing the user devices to operate using correct network slices and services while the user devices move around between home and visited networks.

It will further be appreciated that at least two signaling mechanisms by which UEs can identify their coexistent grouping capability are disclosed. An existing field of an existing identifier may be repurposed in one signaling mechanism, while a new identifier may be introduced using another signaling mechanism.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of wireless communication, comprising:
    transmitting, by a wireless terminal, a registration request to a first network device indicating whether the wireless terminal supports a use of a coexistent slice grouping technique, wherein the coexistent slice grouping technique groups network slices in groups in which intra-group network slices are capable of serving the wireless terminal simultaneously and inter-group network slices are disallowed from serving the wireless terminal simultaneously;
    receiving, by the wireless terminal, a message carrying information about one or more of an allowed network slice instance assistance information (NSSAI) and a configured NSSAI; and
    performing further communication by the wireless terminal based on the information in the message,
    wherein in case that the registration request indicates that the wireless terminal supports a use of the coexistent slice grouping technique and there are more than one coexistent slicing groups configured for the wireless terminal according to a subscription of the wireless terminal, and in case the wireless terminal provides an NSSAI associated with the registration request, the allowed NSSAI is determined based on the NSSAI associated with the registration request, and in case the wireless terminal does not provide the NSSAI associated with the registration request, the allowed NSSAI is derived from a slice group that is selected for the wireless terminal from the more than one coexistent slicing groups, and
    wherein in case that the registration request does not indicate that the wireless terminal supports a use of the coexistent slice grouping technique, the wireless terminal receives one or more of the allowed or configured NSSAI for network slices that serve the wireless terminal simultaneously.

2. The method of claim 1, wherein the wireless terminal identifies one or more coexistent slice groups for a single network slice instance assistance identifier (S-NSSAI) based on a slice descriptor field of an identifier of the S-NSSAI.

3. The method of claim 1, wherein the wireless terminal identifies one or more coexistent slice groups for a single network slice instance assistance identifier (S-NSSAI) using a signaling mechanism that is external to the identifier of the S-NSSAI.

4. The method of claim 3, wherein the signaling mechanism includes an additional identifier for the S-NSSAI that signals the one or more coexistent slice groupings.

5. The method of claim 1, wherein the performing further communication includes establishing, by the wireless terminal, a packet data unit session using a network slice from the allowed NSSAI.

6. The method of claim 2, wherein the one or more coexistent slice groups are identifying using values that are specific to a public land mobile network in which the wireless terminal is operating.

7. The method of claim 2, wherein the wireless terminal further identifies, for a concurrent S-NSSAI, that the concurrent S-NSSAI is coexistent with other S-NSSAIs or one or more coexistent slice groups.

8. A wireless terminal apparatus, comprising a processor configured to implement a method of wireless communication, comprising:
    transmitting a registration request to a first network device indicating whether the wireless terminal supports a use of a coexistent slice grouping technique, wherein the coexistent slice grouping technique groups network slices in groups in which intra-group network slices are capable of serving the wireless terminal simultaneously and inter-group network slices are disallowed from serving the wireless terminal simultaneously;
    receiving a message carrying information about one or more of an allowed network slice instance assistance information (NSSAI) and a configured NSSAI; and
    performing further communication by the wireless terminal based on the information in the message,
    wherein in case that the registration request indicates that the wireless terminal supports a use of the coexistent slice grouping technique and there are more than one coexistent slicing groups configured for the wireless terminal according to a subscription of the wireless terminal, and in case the wireless terminal provides an NSSAI associated with the registration request, the allowed NSSAI is determined based on the NSSAI associated with the registration request, and in case the wireless terminal does not provide the NSSAI associated with the registration request, the allowed NSSAI is derived from a slice group that is selected for the wireless terminal from the more than one coexistent slicing groups, and
    wherein in case that the registration request does not indicate that the wireless terminal supports a use of the coexistent slice grouping technique, the wireless terminal receives one or more of the allowed or configured NSSAI for network slices that serve the wireless terminal simultaneously.

9. The wireless terminal of claim 8, wherein the processor is further configured to identify one or more coexistent slice groups for a single network slice instance assistance identifier (S-NSSAI) based on a slice descriptor field of an identifier of the S-NSSAI.

10. The wireless terminal of claim 8, wherein the processor is configured to identify one or more coexistent slice groups for a single network slice instance assistance identifier (S-NSSAI) using a signaling mechanism that is external to the identifier of the S-NSSAI.

11. The wireless terminal of claim 8, wherein the signaling mechanism includes an additional identifier for the S-NSSAI that signals the one or more coexistent slice groupings.

12. The wireless terminal of claim 8, wherein the processor is configured to perform further communication by establishing a packet data unit session using a network slice from the allowed NSSAI.

13. A method of wireless communication, comprising:
receiving, by a network-side device, a registration request from a wireless terminal indicating whether the wireless terminal supports a use of a coexistent slice grouping technique, wherein the coexistent slice grouping technique groups network slices in groups in which intra-group network slices are capable of serving the wireless terminal simultaneously and inter-group network slices are disallowed from serving the wireless terminal simultaneously;
transmitting, by the network-side device, a message carrying information about one or more of an allowed network slice instance assistance information (NSSAI) and a configured NSSAI to the wireless terminal; and
providing further connectivity to the wireless terminal based on the information in the message,
wherein in case that the registration request indicates that the wireless terminal supports a use of the coexistent slice grouping technique and there are more than one coexistent slicing groups configured for the wireless terminal according to a subscription of the wireless terminal, and in case the network-side device receives an NSSAI associated with the registration request, the allowed NSSAI is determined based on the NSSAI associated with the registration request, and in case the network-side device does not receive the NSSAI associated with the registration request, the allowed NSSAI is derived from a slice group that is selected for the wireless terminal from the more than one coexistent slicing groups, and
wherein in case that the registration request does not indicate that the wireless terminal supports a use of the coexistent slice grouping technique, the network-side device provides the wireless terminal with one or more of the allowed or configured NSSAI for network slices that serve the wireless terminal simultaneously.

14. The method of claim 13, wherein the registration request identifies one or more coexistent slice groups for a single network slice instance assistance identifier (S-NSSAI) based on a slice descriptor field of an identifier of the S-NSSAI.

15. The method of claim 13, wherein the registration request identifies one or more coexistent slice groups for a single network slice instance assistance identifier (S-NSSAI) using a signaling mechanism that is external to the identifier of the S-NSSAI.

16. The method of claim 13, wherein the signaling mechanism includes an additional identifier for the S-NSSAI that signals the one or more coexistent slice groupings.

17. The method of claim 13, wherein the providing further connectivity includes establishing, for the wireless terminal, a packet data unit session using a network slice from the allowed NSSAI.

18. The method of claim 14, wherein the registration request identifies one or more coexistent slice groups as default coexistent slice groups.

19. The method of claim 18, further including, assigning the allowed NSSAI by selecting one of the default coexistent slice groups.

20. The method of claim 13, wherein the registration request identifies, for a concurrent S-NSSAI, that the concurrent S-NSSAI is coexistent with one or more other S-NSSAIs or coexistent slice groups.

21. The method of claim 13, further including:
assigning to wireless terminal, in case that the registration request is an initial registration request, a globally unique identifier; and
refraining from assigning another globally unique identifier in case that the registration request is a re-registration request.

22. The method of claim 13, wherein the providing further connectivity includes providing information about the wireless terminal's support for the use of the coexistent slice grouping technique to other functions in a wireless network.

23. A wireless communication apparatus comprising a processor configured to implement a method, comprising
receiving a registration request from a wireless terminal indicating whether the wireless terminal supports a use of a coexistent slice grouping technique, wherein the coexistent slice grouping technique groups network slices in groups in which intra-group network slices are capable of serving the wireless terminal simultaneously and inter-group network slices are disallowed from serving the wireless terminal simultaneously;
transmitting a message carrying information about one or more of an allowed network slice instance assistance information (NSSAI) and a configured NSSAI; and
providing further connectivity to the wireless terminal based on the information in the message,
wherein in case that the registration request indicates that the wireless terminal supports a use of the coexistent slice grouping technique and there are more than one coexistent slicing groups configured for the wireless terminal according to a subscription of the wireless terminal, and in case the wireless terminal provides an NSSAI associated with the registration request, the allowed NSSAI is determined based on the NSSAI associated with the registration request, and in case the wireless terminal does not provide the NSSAI associated with the registration request, the allowed NSSAI is derived from a slice group that is selected for the wireless terminal from the more than one coexistent slicing groups, and
wherein in case that the registration request does not indicate that the wireless terminal supports a use of the coexistent slice grouping technique, the wireless terminal is provided with one or more of the allowed or configured NSSAI for network slices that serve the wireless terminal simultaneously.

24. The apparatus of claim 23, wherein the registration request identifies one or more coexistent slice groups for a single network slice instance assistance identifier (S-NSSAI) based on a slice descriptor field of an identifier of the S-NSSAI.

25. The apparatus of claim 23, wherein the registration request identifies one or more coexistent slice groups for a single network slice instance assistance identifier (S-NS-SAI) using a signaling mechanism that is external to the identifier of the S-NSSAI.

26. The apparatus of claim 23, wherein the signaling mechanism includes an additional identifier for the S-NSSAI that signals the one or more coexistent slice groupings.

27. The apparatus of claim 23, wherein the providing further connectivity includes establishing, for the wireless terminal, a packet data unit session using a network slice from the allowed NSSAI.

28. The apparatus of claim 23, wherein the registration request identifies one or more coexistent slice groups as default coexistent slice groups.

29. The apparatus of claim 28, further including, assigning the allowed NSSAI by selecting one of the default coexistent slice groups.

30. The apparatus of claim 23, wherein the registration request identifies, for a concurrent S-NSSAI, that the concurrent S-NSSAI is coexistent with one or more other S-NSSAIs or coexistent slice groups.

* * * * *

UNITED STATES PATENT AND TRADEMARK OFFICE
CERTIFICATE OF CORRECTION

PATENT NO. : 11,076,347 B2  
APPLICATION NO. : 16/149113  
DATED : July 27, 2021  
INVENTOR(S) : Tricci So Page 1 of 1

It is certified that error appears in the above-identified patent and that said Letters Patent is hereby corrected as shown below:

On the Title Page

Item (71), Line 1, delete "Guangdong" and insert -- Shenzhen --, therefor.

In the Specification

In Column 10, Line 67, delete "document" and insert -- document. --, therefor.

In the Claims

In Column 20, Line 47, in Claim 23, delete "request," and insert -- request is received, --, therefor.

In Column 20, Line 51, in Claim 23, delete "request," and insert -- request is not received, --, therefor.

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*